United States Patent
Yun

(10) Patent No.: US 11,929,678 B2
(45) Date of Patent: Mar. 12, 2024

(54) POWER SUPPLY DEVICE USING INTELLIGENT PRE-REGULATOR

(71) Applicant: SJ SOLUTION CO., LTD., Busan (KR)

(72) Inventor: Yeong Ryong Yun, Incheon (KR)

(73) Assignee: SJ SOLUTION CO., LTD., Busan (KR)

( * ) Notice: Subject to any disclaimer, the term of this patent is extended or adjusted under 35 U.S.C. 154(b) by 219 days.

(21) Appl. No.: 17/599,893

(22) PCT Filed: Apr. 9, 2020

(86) PCT No.: PCT/KR2020/004801
§ 371 (c)(1),
(2) Date: Sep. 29, 2021

(87) PCT Pub. No.: WO2020/213890
PCT Pub. Date: Oct. 22, 2020

(65) Prior Publication Data
US 2022/0173660 A1   Jun. 2, 2022

(30) Foreign Application Priority Data
Apr. 15, 2019 (KR) .......... 10-2019-0043663

(51) Int. Cl.
*H02M 3/158* (2006.01)
*H02M 1/00* (2006.01)
*H02M 3/335* (2006.01)

(52) U.S. Cl.
CPC ......... *H02M 3/1582* (2013.01); *H02M 1/007* (2021.05); *H02M 1/0093* (2021.05); *H02M 3/33507* (2013.01)

(58) Field of Classification Search
CPC ............ H02M 1/0016; H02M 1/0019; H02M 1/0022; H02M 1/32; H02M 1/0067; H02M 1/007; H02M 1/0077; H02M 1/008; H02M 1/0093; H02M 1/0083; H02M 1/0087
See application file for complete search history.

(56) References Cited

U.S. PATENT DOCUMENTS 6,307,357 B1 * 10/2001 Botti .................. H02M 3/155
330/297
2008/0304298 A1 * 12/2008 Toba .................. H02H 7/122
363/56.01

(Continued)

FOREIGN PATENT DOCUMENTS

EP    2573899 A1 *  3/2013  .......... B60L 11/1803
EP    3226395 A1 * 10/2017  .............. B60L 58/20

(Continued)

*Primary Examiner* — Gustavo A Rosario-Benitez
(74) *Attorney, Agent, or Firm* — IPLA P.A.

(57) ABSTRACT

A power supply unit using intellectual pre-regulator which includes an input port connected to a power source realized as battery or generator (hereinafter, it is called as 'battery'), an output port connected to an electronic device, a voltage dropping part connected between said input port and said output port to drop the input voltage to match it to the voltage required by said electronic device, and a detection-control part to detect the voltage required by said electronic device connected to said output port and to transfer it to said voltage dropping part.

4 Claims, 5 Drawing Sheets

(56) References Cited

U.S. PATENT DOCUMENTS

| | | | | |
|---|---|---|---|---|
| 2009/0296434 | A1* | 12/2009 | De Rooij | H02M 7/53871 363/71 |
| 2010/0270986 | A1* | 10/2010 | Alimenti | H02M 3/1582 323/282 |
| 2012/0175958 | A1* | 7/2012 | Dighrasker | H02M 3/1582 307/66 |
| 2012/0280571 | A1* | 11/2012 | Hargis | G05F 1/67 307/77 |
| 2016/0204698 | A1* | 7/2016 | Yuzurihara | H02M 3/1582 323/290 |
| 2016/0254751 | A1* | 9/2016 | Mao | H02M 3/1582 323/271 |
| 2021/0344202 | A1* | 11/2021 | Yu | H02M 7/06 |

FOREIGN PATENT DOCUMENTS

| | | |
|---|---|---|
| KR | 1020060031463 | 4/2006 |
| KR | 100696563 | 3/2007 |
| KR | 100754484 | 9/2007 |
| KR | 1020090062551 | 6/2009 |
| KR | 1020120122751 | 11/2012 |

* cited by examiner

POWER SUPPLY DEVICE USING INTELLIGENT PRE-REGULATOR

BACKGROUND

The present invention relates to a power supply unit using intellectual pre-regulator, and in more detail, relates to a power supply unit using intellectual pre-regulator which associates a voltage boost part with a voltage dropping part by means of a detection-control part to do heat management easily and at the same time, to obtain an output of high power so as to enhance the reliability of product.

A battery used in a car generally has 12V of voltage. Most of electronic devices presently used in cars such as mobile phones have voltage specifications in the range of 5 to 9 volts according to the uses of products. Therefore, there are no needs for voltage boost in the present time. However, there is a trend in which the electronic devices will be diversified to have the various voltage specifications in the wide range of 3 to 22 volts. Also, the traditional electronic devices only have 24 watts or less of power contents, but there is a trend in which new products will require up to 100 watts of power specifications.

Voltage conversion devices for cars are installed in a small closed space, and so require an appropriate temperature management of the product for the conversion to 50 watts or more, particularly 100 watts. FIG. 1 schematically shows the circuit constitution of a general buck-boost converter. The buck-boost converter in FIG. 1 acts as a boost converter when Q3 and Q4 are controlled to switch in the condition of Q1 being in the on state and Q2 being in the off state, and acts as a buck converter when Q1 and Q2 are controlled to switch in the condition of Q3 being in the off state and Q4 being in the on state. In such a buck-boost converter, the semiconductor switching control part (A10: Buck-Boost Controller), which controls the switching actions, must prepare complicated control logic in order to perform both of the boost and buck actions, so it must deal with the heat consumption caused by the 100 watt transformation, for example. Therefore, such a buck-boost converter has a shortcoming that it cannot easily manage the temperature of product. In other words, the buck-boost converter product has a complicated constitution and logic appropriately to control the voltage control switches according to the conditions of inputs and outputs, so it cannot easily do the heat management. Therefore it is difficult for the buck-boost converter to constitute a reliable product, because it has an immoderate temperate. In case that the FETs are separately used without inclusion in the semiconductor chip due to the difficulty of such a heat management, the separate control for the FETs cannot be guaranteed to be reliable, and the uniform product quality control cannot be achieved in accordance with the selection of FETs and the entire constitution.

Meanwhile, FIG. 2 schematically shows the circuit constitution of a general pre-boost and drop type converter. The general pre-boost and drop type converter has a structure in which an independently acting boost converter is arranged in front of an independently acting buck converter. In the general pre-boost and drop type converter, the semiconductor switching control part (A6: Buck Regulator), which acts as a buck controller, and the semiconductor switching control part (A9: Boost Regulator), which acts as a boost controller are not associated with each other, namely they act independently from each other. Therefore, the general pre-boost and drop type converter is not efficient when it performs power transformation for various electronic devices in the various voltage specifications. In other words, it requires heat management corresponding to 200 watts in order to perform the 100 watt power transformation. Therefore, it nearly has not any advantage comparing to the buck-boost converter shown in FIG. 1.

PRIOR ART DOCUMENTS

Patent Registration No. 10-0688953 (registered on 23 Feb. 2007)
Patent Registration No. 10-0696563 (registered on 12 Mar. 2007)
Patent Registration No. 10-0917976 (registered on 11 Sep. 2009)

SUMMARY OF THE INVENTION

The present invention is invented to improve the problems of the prior arts. Therefore, the purpose of the present invention is to provide a power supply unit using intellectual pre-regulator which associates a voltage boost part with a voltage dropping part by means of a detection-control part to do heat management easily and at the same time, to obtain an output of high power so as to enhance the reliability of product.

The purpose of the present invention is also to provide a power supply unit using intellectual pre-regulator which is constituted by addition of a simple circuit for boost to the constitution of buck converter generally used, and thus which is simple in the entire constitution and easy in the manufacture.

The other purposes and advantages of the present invention will be sufficiently understood by the detailed description of the present invention.

The power supply unit using intellectual pre-regulator according to the present invention comprises an input port connected to a battery, an output port connected to an electronic device, a voltage dropping part connected between said input port and said output port to drop the input voltage to match it to the voltage required by said electronic device, and a detection-control part to detect the voltage required by said electronic device connected to said output port and to transfer it to said voltage dropping part.

According to one aspect of the present invention, in the power supply unit of the present invention, a voltage boost circuit part is further arranged between the positive pole of said input port and the negative pole of said output port, said voltage boost circuit part is controlled by said detection-control part to produce a negative voltage at the negative pole of said output port from the voltage of the battery connected to said input port, and a switching element is further arranged between the negative pole of said input port and the negative pole of said output port.

Said detection-control part makes said voltage boost circuit part being in the off state not to produce a negative voltage when the required voltage of the electronic device is lower than the battery voltage, at this time, said switching element is in the on state to flow a current from the negative pole of said output port to the negative pole of said input port, and the battery voltage is dropped by said voltage dropping part to the voltage same as the required voltage of the electronic device at said output port, meanwhile, said detection-control part makes said voltage boost circuit part switching to produce a negative voltage when the required voltage of the electronic device is higher than the battery voltage, at this time, said switching element is in the off state not to flow a current from the negative pole of said output port to the negative pole of said input port, and the voltage between the positive pole of said input port and the negative pole of said output port is dropped by said voltage dropping part to the voltage same as the required voltage of the electronic device at said output port.

In an embodiment of the present invention, said voltage boost circuit part comprises a FET switched by the control of said detection-control part, a transformer, a diode and a capacitor, in which said FET and the first side coil of said transformer are serially connected between the positive pole of said input port and the negative pole of said input port, the second side coil of said transformer, said capacitor and said diode are serially connected in order at the second side circuit of said transformer, the positive pole of the second side coil of said transformer is connected to the negative pole of said input port, and the negative pole of said capacitor is connected to the negative pole of said output port.

In another embodiment of the present invention, said voltage boost circuit part comprises a first and second FETs alternatively switched by the control of said detection-control part, an inductor and a capacitor, in which said first FET, said second FET and said capacitor are connected to said input port in order, said inductor is connected to the point between said first FET and said second FET, as parallel to said capacitor, one terminal of said capacitor is connected to the negative pole of said input port and the other terminal of said capacitor is connected to the negative pole of said output port.

In another embodiment of the present invention, said voltage boost circuit part comprises a FET switched by the control of said detection-control part, a diode, an inductor and a capacitor, in which said FET, said diode and said capacitor are serially connected to said input port in order, at this time said diode is reversely connected to the direction of said serial order, said inductor is connected to the point between said FET and said diode, as parallel to said capacitor, and one terminal of said capacitor is connected to the negative pole of said input port and the other terminal of said capacitor is connected to the negative pole of said output port.

Said switching element arranged between the negative pole of said input port and the negative pole of said output port may be a diode.

It is preferred that said output port may be a USB port.

The voltage dropping part comprises a first and a second FETs, a semiconductor switching control part alternatively switching said first and second FETs, an inductor, a capacitor, a first voltage detection circuit and a second voltage detection circuit, said first and second FETs are serially arranged between the positive pole of said input port and the negative pole of said output port, said inductor is arranged between the point between said first FET and said second FET and the positive pole of said output port, said capacitor is arranged between the positive pole of said output port and the negative pole of said output port, said first voltage detection circuit is arranged between the positive pole of said input port and the negative pole of said output port, said detection-control part detects the voltage between the positive pole of said input port and the negative pole of said output port by said first voltage detection circuit to transfer it to said semiconductor switching control part, or said semiconductor switching control part detects the voltage between the positive pole of said output port and the negative pole of said output port by said first voltage detection circuit, said second voltage detection circuit is arranged between the positive pole of said output port and the negative pole of said output port, said detection-control part detects the voltage between the positive pole of said output port and the negative pole of said output port by said second voltage detection circuit to transfer it to said semiconductor switching control part, or said semiconductor switching control part detects the voltage between the positive pole of said output port and the negative pole of said output port by said second voltage detection circuit, said semiconductor switching control part controls the switching for said first and second FETs based on the voltage values to match the voltage of said output port to the required voltage of the electronic device connected to said output port.

Said voltage dropping part further comprises a resistance arranged at the point between said inductor and the positive pole of said output port before the bifurcation of said capacitor, and said semiconductor switching control part detects the current by said resistance to control the current flowing to said output port.

The power supply unit using intellectual pre-regulator according to the present invention comprises an input port connected to a battery, an output port connected to an electronic device, a voltage dropping part connected between said input port and said output port to drop the input voltage to match it to the voltage required by said electronic device, and a detection-control part to detect the voltage required by said electronic device connected to said output port and to transfer it to said voltage dropping part.

According to another aspect of the present invention, in the power supply unit of the present invention, a voltage boost circuit part is further arranged before said voltage dropping part, said voltage boost circuit part is controlled by said detection-control part to produce a voltage higher than the battery voltage from the voltage of the battery connected to said input port.

Said detection-control part makes the switching element in said voltage boost circuit part being in the off state not to produce a voltage boosting when the required voltage of the electronic device is lower than the battery voltage, and the battery voltage is dropped by said voltage dropping part to the voltage same as the required voltage of the electronic device at said output port, meanwhile, said detection-control part makes the switching element in said voltage boost circuit part switching according to duty ratio to produce a voltage boosting when the required voltage of the electronic device is higher than the battery voltage, and the boosted voltage is dropped by said voltage dropping part to the voltage same as the required voltage of the electronic device at said output port.

Said detection-control part determines the duty ratio so as to minimize the voltage boost ratio in the condition of matching the voltage of said output port to the required voltage of the electronic device.

It is preferred that said output may be a USB port.

It is preferred that said detection-control part may determine the duty ratio so as to minimize the voltage boost ratio based on detecting the input voltage input into said voltage dropping part, which is not yet dropped, and detecting the output voltage output from said voltage dropping part, which has been dropped.

Effect of Invention

The power supply unit using intellectual pre-regulator according to the present invention, which particularly applies to a car, can enhance the reliability of product by associating a voltage boost part with a voltage dropping part by means of a detection-control part to do heat management easily and at the same time, to obtain an output of high power. The power supply unit of the present invention is simple in the entire constitution and easy in the manufacture by addition of a simple circuit for boost to the constitution of buck converter generally used.

DETAILED DESCRIPTION OF THE INVENTION

The present invention will be described in detail in view of the drawings, below.

Figure 3:
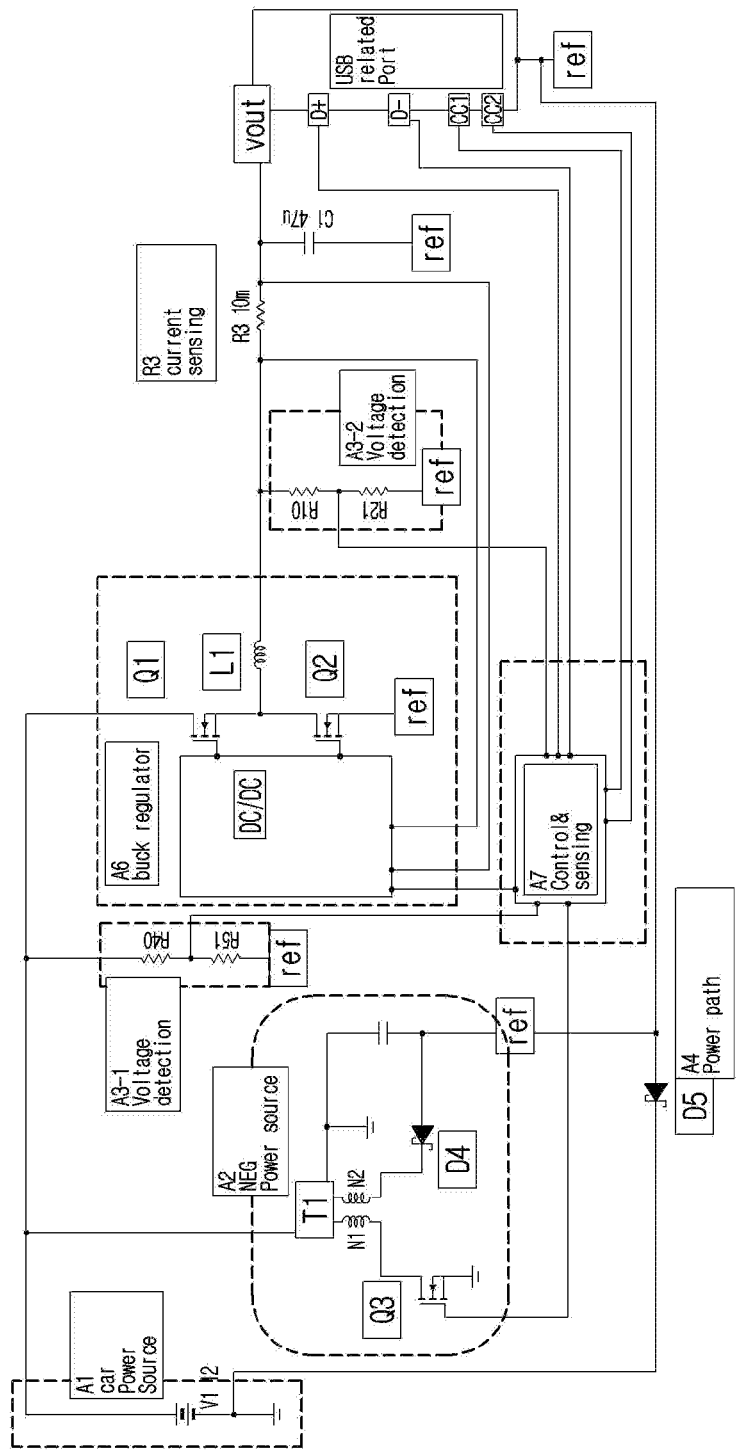
FIG. 3 schematically shows the circuit constitution of the power supply unit using intellectual pre-regulator according to one embodiment of the present invention.

FIG. 3 schematically shows the circuit constitution of the power supply unit using intellectual pre-regulator according to one embodiment of the present invention. As shown in FIG. 3, the power supply unit of the present invention comprises a voltage dropping part connected between an input port A1 and an output port A8. A power source realized as battery or generator (hereinafter, it is called as 'battery') may be connected to the input port A1 and various electronic devices having various voltage specifications may be connected to the output port A8. It is preferred that the output port may be a USB port. Therefore, the voltage dropping part can drop the voltage to match it to the voltage required by the electronic device connected to the output port A8. The power supply unit of the present invention also comprises a detection-control part A7. The detection-control part A7 can detect the required voltage of the electronic device connected to the output port A8 and transfer it to the voltage dropping part.

The construction on the voltage dropping part and the detection-control part A7 comprised in the power supply unit of the present invention is also to apply to the general buck converter. Such a voltage dropping part is simple in the construction and widely used so that it may be easy to be sought. Meanwhile, the present invention is different from the general buck converter in the constitutions as described below.

In the power supply unit of the present invention, a voltage boost circuit part A2 is arranged between the positive pole of the input port A1 and the negative pole ref of the output port A8. The voltage boost circuit part A2 are controlled by the detection-control part A7 to produce a negative voltage at the negative pole ref of the output port A8 from the voltage of the battery connected to the input port A1. The detection-control part A7 controls the voltage boost circuit part A2 by PWM control. A switching element D5 is arranged between the negative pole of the input port A1 and the negative pole ref of the output port A8, namely on the power path A4. It is preferred that the switching element D5 may be a diode, but it may be a FET switching-controlled by the detection-control part A7 according to circumstances.

The detection-control part A7 makes the voltage boost circuit part A2 being in the off state not to produce a negative voltage when the required voltage of the electronic device is lower than the battery voltage. At this time, the switching element D5 is in the on state so that a current may flow from the negative pole ref of the output port A8 to the negative pole of the input port A1. Therefore, the battery voltage is dropped by the voltage dropping part to be matched to the voltage same as the required voltage of the electronic device at the output port A8.

Meanwhile, the detection-control part A7 makes the voltage boost circuit part A2 being switched to produce a negative voltage when the required voltage of the electronic device is higher than the battery voltage. At this time, the switching element D5 is in the off state so that a current may not flow from the negative pole ref of the output port A8 to the negative pole of the input port A1. Therefore, the voltage between the positive pole of the input port A1 and the negative pole ref of the output port A8 is dropped by the voltage dropping part to be matched to the voltage same as the required voltage of the electronic device at the output port A8.

In details, as shown in FIG. 3, the voltage boost circuit part A2 comprises a FET Q3 switched by the control of the detection-control part A7, a transformer T1, a diode D4 and a capacitor C. At this time, the FET Q3 and the first side coil of the transformer T1 are serially connected between the positive pole of the input port A1 and the negative pole of the input port A1, the second side coil of the transformer T1, the capacitor C and the diode D4 are serially connected in order in the second side circuit of the transformer T1, the positive pole of the second side coil of the transformer T1 is connected to the negative pole of the input port A1, and the negative pole of the capacitor is connected to the negative pole ref of the output port A8. The negative pole of the input port A1 is generally connected to the ground.

In the power supply unit of the present invention as shown in FIG. 3, the voltage dropping part comprises a first and second FETs Q1 and Q2, a semiconductor switching control part A6 which switches the first and second FETs Q1 and Q2 alternatively, an inductor L1, a capacitor C, a first voltage detection circuit A3-1, and a second voltage detection circuit A3-2.

The first and second FETs Q1 and Q2 are serially arranged between the positive pole of the input port A1 and the negative pole ref of the output port A8. The inductor L1 is arranged between the point between the first FET Q1 and the second FET Q2 and the positive pole of the output port A8. The capacitor C is arranged between the positive pole of the output port A8 and the negative pole ref of the output port A8.

The first voltage detection circuit A3-1 is arranged between the positive pole of the input port A1 and the negative pole ref of the output port A8. The first voltage detection circuit A3-1 may comprise two of resistances R40 and R51. The detection-control part A7 can detect the voltage between the positive pole of the input port A1 and the negative pole ref of the output port A8 by means of the first voltage detection circuit A3-1 and transfer it to the semiconductor switching control part A6. At this time, the detection-control part A7 can detect the voltage between the positive pole of the input port A1 and the negative pole ref of the output port A8 by being connected to the point between the two resistances R40 and R51 and measuring the voltage at the point. Alternatively, instead of the detection-control part A7, the semiconductor switching control part A6 may detect the voltage between the positive pole of the input port A1 and the negative pole ref of the output port A8 by means of the first voltage detection circuit A3-1.

The second voltage detection circuit A3-2 is arranged between the positive pole of the output port A8 and the negative pole ref of the output port A8. The detection-control part A7 can detect the voltage between the positive pole of the output port A8 and the negative pole ref of the output port A8 by means of the second voltage detection circuit A3-2 and transfer it to the semiconductor switching control part A6. At this time, the detection-control part A7 can detect the voltage between the positive pole of the output port A8 and the negative pole ref of the output port A8 by being connected to the point between the two resistances R10 and R21 and measuring the voltage at the point. Alternatively, instead of the detection-control part A7, the semiconductor switching control part A6 may detect the voltage between the positive pole of the output port A8 and the negative pole ref of the output port A8 by means of the second voltage detection circuit A3-2.

The semiconductor switching control part A6 can control the switching of the first and second FETs Q1 and Q2 based on the voltage values as obtained above, to match the voltage of the output port A8 to the required voltage of the electronic device connected to the output port A8.

The voltage dropping part may further comprise a resistance R3 which is arranged at the point between the inductor L1 and the positive pole of the output port A8 before the bifurcation of the capacitor C. It is preferred that the resistance R3 may have small value as possible. The semiconductor switching control part A6 can detect the current by means of the resistance R3 and control the current to the output port A8.

The action of the power supply unit according to the present invention will be described in more detail, as follows:

The detection-control part A7 detects the required voltage of the electronic device connected to the output port A8 and transfers it to the semiconductor switching control part A6 in the voltage dropping part. When the required voltage of the electronic device is lower than the battery voltage, for example if the battery voltage is 12V and the required voltage of the electronic device is 5V, the detection-control part A7 makes the FET Q3 of the voltage boost circuit part A2 being in the off state. Then, no current flows to the first side coil of the transformer T1. So, no electromotive force occurs at the second side coil of the transformer T1, and no negative voltage forms at the negative pole ref of the output port A8. At this time, the switching element D5 becomes to the on state so that a current may flow from the negative pole ref of the output port to the negative pole of the input port.

When the voltage boost does not occur by the voltage boost circuit part A2, the battery voltage, for example 12V is not boosted, but only drops by the voltage dropping part so that the voltage of the output port A8 becomes identical to the required voltage of the electronic element, for example 5V. For this, the semiconductor switching control part A6 included in the voltage dropping part performs the switching control alternatively to switch the first and second FETs Q1 and Q2. At this time, the voltage dropping ratio is determined according to the duty ratio in the switching of the first FET Q1. The semiconductor switching control part A6 performs the switching control of the first and second FETs Q1 and Q2 based on the voltage values detected by the first voltage detection circuit A3-1 and the second voltage detection circuit A3-2 to match the voltage of the output port A8 to the required voltage of the electronic device connected to the output port A8. So, the semiconductor switching control part A6 can precisely control the voltage drop and produce a precise and stable output voltage.

Meanwhile, when the required voltage of the electronic device is higher than the battery voltage, for example, if the battery voltage is 12V and the required voltage of the electronic device is 20V, the detection-control part A7 switches the FET Q3 in the voltage boost circuit part A2 by PWM control. Then, a current flows to the first side coil of the transformer T1 and an electromotive force occurs at the second side coil of the transformer T1. As a result, a negative voltage occurs at the negative pole ref of the output port A8. At this time, the switching element D5 plays a role of blocking the current to flow from the negative pole ref of the output port A8 to the negative pole of the input port A1.

The voltage boost takes place by the voltage boost circuit part A2, the boosted voltage becomes dropped so that the voltage of the output port A8 may become identical to the required voltage of the electronic device. For example, the battery voltage 12V may be boosted to 21V, and then it may be dropped to the required voltage 20V by the voltage dropping part.

The voltage boost ratio by the voltage boost circuit part A2 is dependent to the duty ratio of the detection-control part A7 switching the FET Q3. If the duty ratio is 0, then the voltage boost ratio becomes to 1, namely the voltage does not boost. The voltage boost ratio will become high as the duty becomes high.

It is preferred that the detection-control part A7 may determine the duty ratio as the voltage boost ratio being minimized in the condition that the voltage of the output port A8 becomes identical to the required voltage of the electronic device by the voltage dropping part. So, the heat consumption in the voltage dropping part may occur at a minimum. Namely, the voltage dropping part may act efficiently.

At this time, the detection-control part A7 does not need to control the voltage boost circuit part A2 precisely in order to match the voltage of the output port A8 to the required voltage of the electronic device. In other words, the precise control to match the voltage of the output port A8 to the required voltage of the electronic device can be performed by the semiconductor switching control part A6 in the voltage dropping part, therefore, in front of the voltage dropping part, the detection-control part A7 does not need to control the voltage boost ratio precisely. So, the detection-control part A7 does not need to prepare a complicated circuit constitution or logic to control precisely the voltage boost ratio.

This means that the voltage boost circuit part only plays a role of supplement so that the output voltage may not be in lack. Therefore, the present invention can enhance the availability of the buck converter which is widely used by separating the simple auxiliary part of voltage boost and the precise voltage control part. In this case, the detection-control part A7 must determine the voltage boost ratio stably to achieve the condition that the voltage of the output port A8 finely becomes identical to the required voltage of the electronic device by the voltage dropping part. For example, in the case that the battery voltage is 12V and the required voltage of the electronic device is 20V, if the battery voltage 12V is perfectly stable, the battery voltage 12V may be boosted to 20V by the voltage boost circuit part A2 and then the final output voltage may become to 20V without the voltage drop by the voltage dropping part. In order for the voltage drop not to occur in the voltage dropping part, the first FET Q1 must be continuously in the on state, and the second FET Q2 must be continuously in the off state. Namely, the first FET Q1 must act in 100% duty mode. Then, because the voltage dropping part does not perform the voltage drop action, namely the switching action, heating does not occur and so there is no problem in view of heat management.

However, in general, the battery voltage is unstable, for example, may be fluctuated in the range of 11V to 13V. In this case, in order to achieve the condition that the voltage of the output port A8 must finally become identical to the required voltage of the electronic device by the voltage dropping part, the voltage boost ratio must be determined based on the battery minimum voltage, for example 11V. If the battery voltage becomes 11V in a moment, it may be boosted to 20V by the voltage boost circuit part A2 and the voltage dropping part may not perform the drop action. Meanwhile, if the battery voltage becomes 13V in a moment, it may be boosted to 23.6V by the voltage boost circuit part A2, and the voltage dropping part may perform the drop action in order for the final output voltage to become 20V. In this case, the voltage dropping part performs the voltage drop action, namely the switching action, in a minimum degree, so the heat which occurs in the action may be minimized and there is no problem in view of the heat management.

On the other hand, the final output voltage is supposed to become stable in the above explanation, although the voltage dropping part does not substantially perform the voltage drop action, but the battery voltage is actually unstable and a stable voltage cannot be obtained by the voltage boost circuit part A2. Therefore, the voltage dropping part should perform some degree of the switching action in order to obtain the final output voltage being stable. According to the present invention, the voltage dropping part may act in a minimum switching action mode. The minimum switching action of the voltage dropping part may be determined according to the detailed construction of the voltage dropping part. When the voltage dropping part acts in a minimum switching action mode, the heat which occurs in the action will be minimized and there is no problem in view of the heat management.

Figure 4:
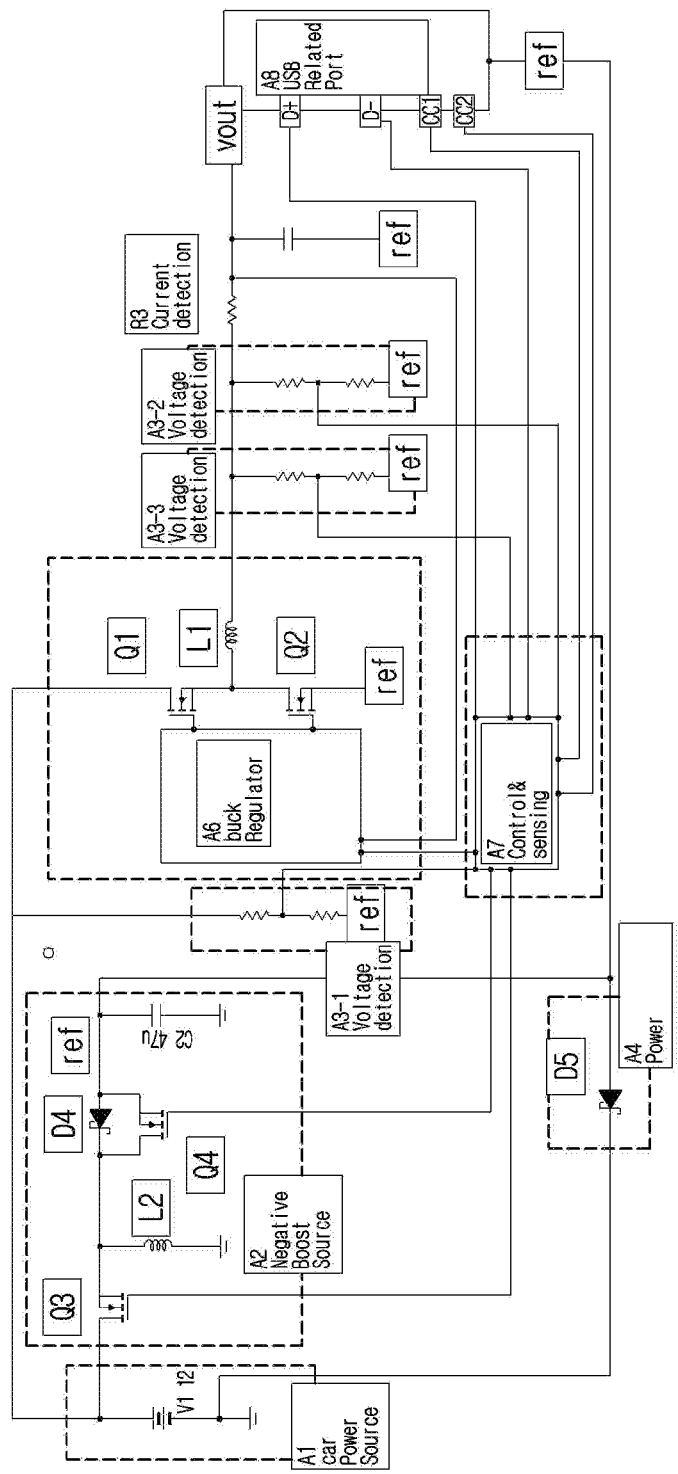
FIG. 4 schematically shows the circuit constitution of the power supply unit using intellectual pre-regulator according to another embodiment of the present invention.

FIG. 4 schematically shows the circuit constitution of the power supply unit using intellectual pre-regulator according to another embodiment of the present invention. The embodiment of FIG. 4 is substantially identical to the embodiment of FIG. 3, but different only in view of the detailed construction of the voltage boost circuit part A2.

In FIG. 4, the voltage boost circuit part A2 comprises a first and second FETs Q3 and Q4, which are alternatively switched by the control of the detection-control part A7, an inductor L2 and a capacitor C. The first FET Q3, the second FET Q4 and the capacitor C are serially connected in order to the input port A1. The inductor L2 is connected in parallel to the capacitor C, between the first FET Q3 and the second FET Q4. One terminal of the capacitor C is connected to the negative pole of the input port A1 and the other terminal of the capacitor C is connected to the negative pole ref of the output port A8.

Alternatively, in FIG. 4, the voltage boost circuit part A2 comprises a FET Q3, which is switched by the control of the detection-control part A7, a diode D4, an inductor L2, and a capacitor C. The FET Q3, the diode D4 and the capacitor C are serially connected in order to the input port A1. At this time, the diode D4 is connected in reverse to the direction of the serial order. The inductor L2 is connected in parallel to the capacitor C, between the FET Q3 and the diode D4. One terminal of the capacitor C is connected to the negative pole of the input port A1 and the other terminal of the capacitor C is connected to the negative pole ref of the output port A8.

Figure 5:
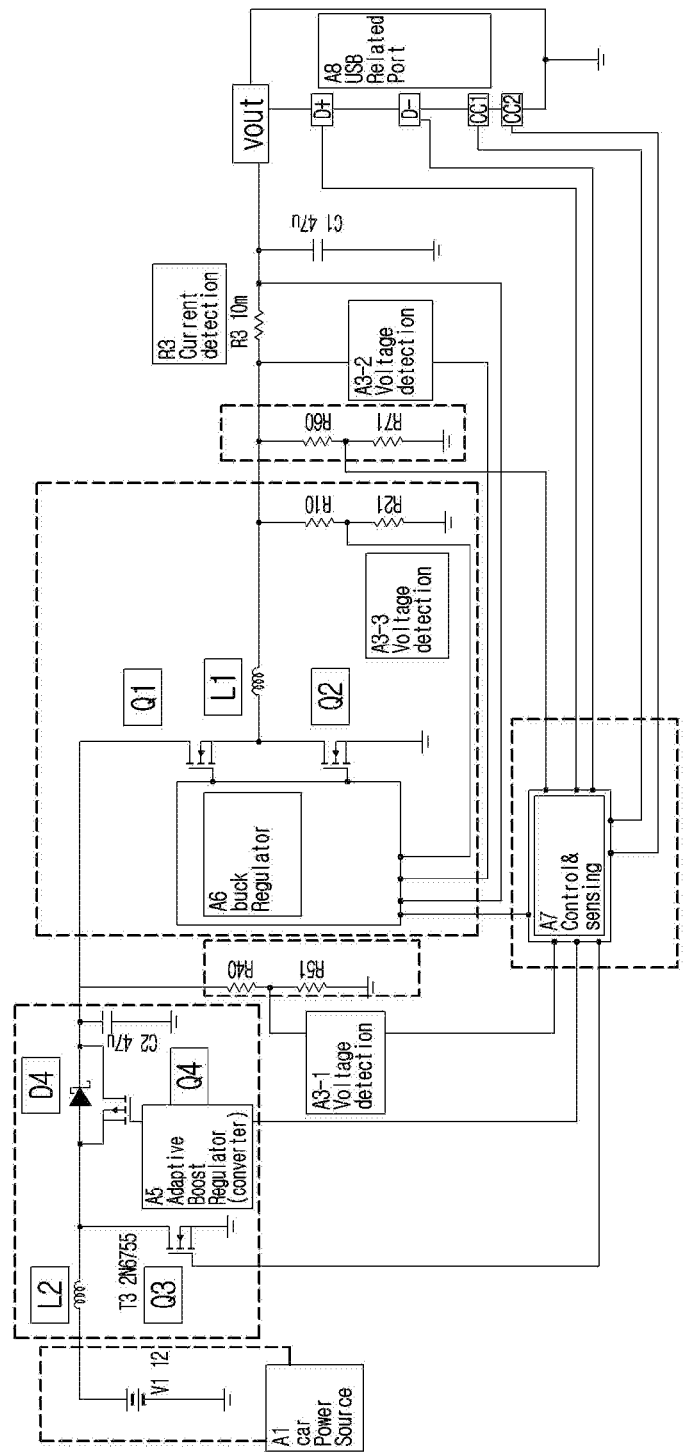
FIG. 5 schematically shows the circuit constitution of the power supply unit using intellectual pre-regulator according to another embodiment of the present invention.

FIG. 5 schematically shows the circuit constitution of the power supply unit using intellectual pre-regulator according to another embodiment of the present invention. The embodiment of FIG. 5 is identical to the embodiments of FIGS. 3 and 4 in view of the concept that a voltage boost circuit part A5 is arranged in front of the voltage dropping part, the voltage dropping part and the voltage boost circuit part A5 may act in association with each other by the detection-control part A7, and the switching action of the voltage dropping part may occur in a minimum degree to minimize the heat which occurs in the voltage dropping part. At this time, the voltage drop action is only performed when the output voltage is lower than the input voltage, and the voltage boost action is firstly performed and then the voltage drop action is performed when the output voltage is higher than the input voltage. However, it is different in the detailed construction that the embodiments of FIGS. 3 and 4 is to achieve the voltage boost in the view that the negative voltage occurs at the negative pole ref of the output port A8 by means of the voltage boost circuit part A2, while the embodiment of FIG. 5 is to achieve the voltage boost in the view that the positive voltage is additionally produced based on the negative pole of the input port A1 by means of the voltage boost circuit part A5.

In more details, referring to FIG. 5, the power supply unit of the present invention comprises a voltage dropping part connected between the input port A1 and the output port A8. A battery may be connected to the input port A1 and one of electronic devices having various voltage specifications may be connected to the output port A8. It is preferred that the output port A8 may be a USB port. Therefore, the voltage dropping part can drop the voltage to become identical to the required voltage of the electronic device connected to the output port A8. The power supply unit of the present invention also comprises a detection-control part A7. The detection-control part A7 detects the required voltage of the electronic device connected to the output port A8 and transfers it to the voltage dropping part.

The constitutions of the voltage dropping part and the detection-control part A7 comprised in the power supply unit according to the embodiment of the present invention as shown in FIG. 5 are substantially identical to those as shown in FIGS. 3 and 4. The embodiment of FIG. 5 is different in the following construction from those of FIGS. 3 and 4. Therefore, the different construction will be described in priority and the same construction will be described with maximally avoiding the repetitions.

Figure 2:
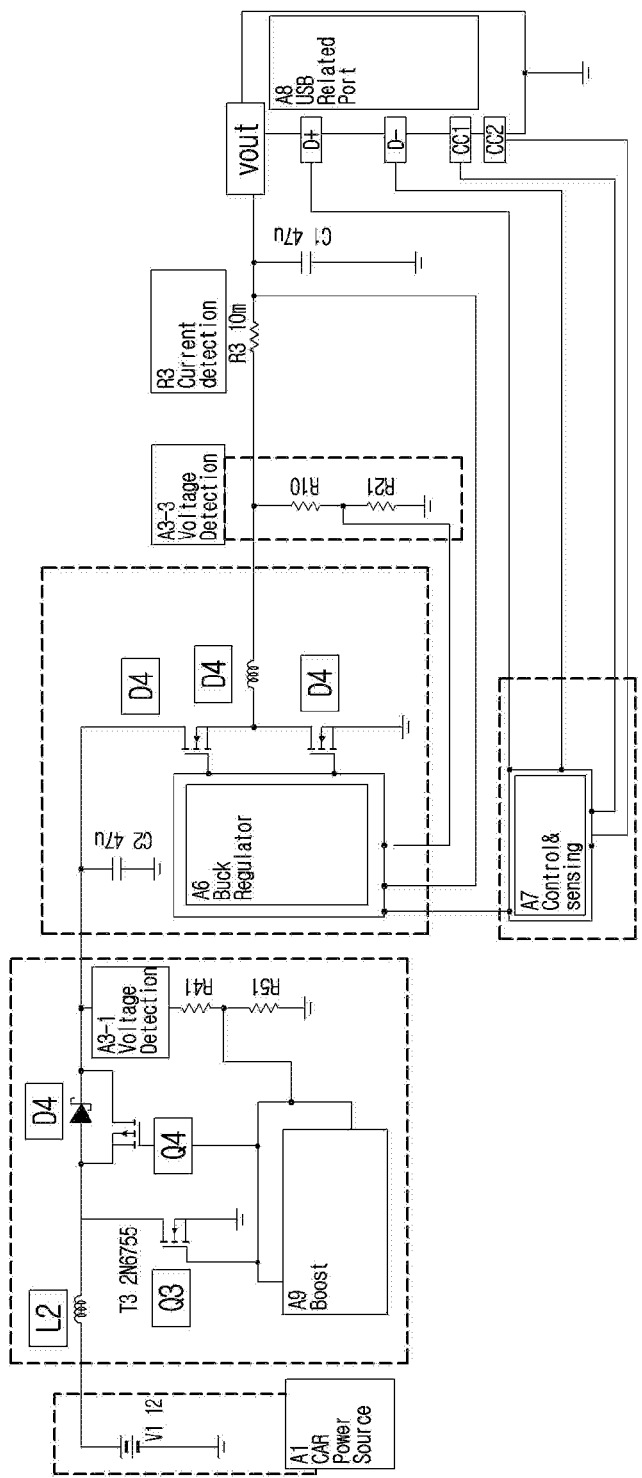
FIG. 2 schematically shows the circuit constitution of a general pre-boost and drop type converter.

In the power supply unit according to this embodiment, the voltage boost circuit part A5 is arranged in front of the voltage dropping part. The voltage boost circuit part A5 is controlled by the detection-control part A7 to produce a voltage higher than the battery voltage from the voltage of the battery connected to the input port A1. The voltage boost circuit part A5 is identical to the circuit to apply to the general boost converter as shown in FIG. 2, but the different point of the power supply unit of this embodiment from that of FIG. 2 is that in the power supply unit of this embodiment, the voltage boost circuit part A5 is controlled by the detection-control part A7 which is associated with the semiconductor switching control part A6 in the voltage dropping part, while the switching of the voltage boost circuit in FIG. 2 is independently controlled without associating with the detection-control part A7 which is associated with the semiconductor switching control part A6 in the voltage dropping part. Therefore, the voltage boost circuit part A5 controlled by the detection-control part A7 may be called as an adaptive boost converter.

The voltage boost circuit part A5 may be constructed to be identical to the circuit to apply to the general boost converter, as mentioned above. Namely, it may be constructed to comprise an inductor L2, a capacitor C and two FETs Q3 and Q4. At this time, the two FETs Q3 and Q4 may be alternatively switched. Instead of the construction, it may be constructed to comprise an inductor L2, a capacitor C, a FET Q3 and a diode D4. The elements are arranged as in FIG. 5.

The detection-control part A7 makes the switching element Q3 of the voltage boost circuit part A5 becoming in the off state so as not to boost the battery voltage when the required voltage of the electronic device is lower than the battery voltage. Then the battery A1 voltage is dropped by the voltage dropping part so that the voltage at the output port A8 may become identical to the required voltage of the electronic device. At this time, as described in the embodiment of FIG. 3, the semiconductor switching control part A6 precisely controls the voltage drop to produce a precise and stable output voltage. Meanwhile, the detection-control part A7 switches the switching element Q3 of the voltage boost circuit part A5 according to the duty ratio to boost the battery voltage when the required voltage of the electronic device is higher than the battery A1 voltage. Then the boosted voltage is dropped by the voltage dropping part so that the voltage at the output port A8 may become identical to the required voltage of the electronic device.

As mentioned above, the voltage boost ratio by the voltage boost circuit part A5 is dependent to the duty ratio in which the detection-control part A7 switches the FET Q3.

It is same as mentioned above that it is preferred that the detection-control part A7 may determine the duty ratio so that the voltage boost ratio becomes to a minimum degree in the condition that the voltage of the output port A8 becomes identical to the required voltage of the electronic device by the voltage dropping part. At this time, it is also same as mentioned above that the detection-control part A7 does not need to control the voltage boost circuit part A5 precisely in order that the voltage of the output port A8 becomes identical to the required voltage of the electronic device.

TABLE 1

| Input | Conventional Method | | | |
|---|---|---|---|---|
| 12 V $V_{out}$ (V) | $I_{out}$ (A) | Output Power (W) | Power wasted at the buck converter (W) | Efficiency (%) |
| 5 | 5 | 25 | 2 | 92 |
| 9 | 5 | 45 | 3.6 | 92 |
| 12 | 5 | 60 | 4.8 | 92 |
| 15 | 5 | 75 | 6 | 92 |
| 20 | 5 | 100 | 8 | 92 |

TABLE 2

| Input | The present invention | | | |
|---|---|---|---|---|
| 12 V $V_{out}$ (V) | $I_{out}$ (A) | Output Power (W) | Power wasted at the buck converter (W) | Efficiency (%) |
| 5 | 5 | 25 | 2 | 92 |
| 9 | 5 | 45 | 3.6 | 92 |
| 12 | 5 | 60 | 1.8 | 97 |

TABLE 2-continued

| Input | The present invention | | | |
|---|---|---|---|---|
| 12 V $V_{out}$ (V) | $I_{out}$ (A) | Output Power (W) | Power wasted at the buck converter (W) | Efficiency (%) |
| 15 | 5 | 75 | 2.25 | 97 |
| 20 | 5 | 100 | 3 | 97 |

It is supposed that the general buck regulator act in 92% of efficiency, the voltage dropping part can achieve 97 to 98% of efficiency when it acts in the 100% duty mode or 3 to 10 cycles skip mode. Table 1 shows the power wasted in the buck converter in accordance with the output voltage when the general buck regulator acts in 92% of of Table 2 shows the power wasted in the voltage dropping part in the present invention. In the present invention, the voltage dropping part acts in 97% of efficiency when the input voltage is 12V and the output voltage is required to be 12V or more, and in accordance with this, the power wasted in the voltage dropping part is only 3 W when 100 W of the output power is obtained. Therefore, at this point, the present invention can efficiently act the voltage dropping part so that the heat management ability becomes excellent.

Figure 1:
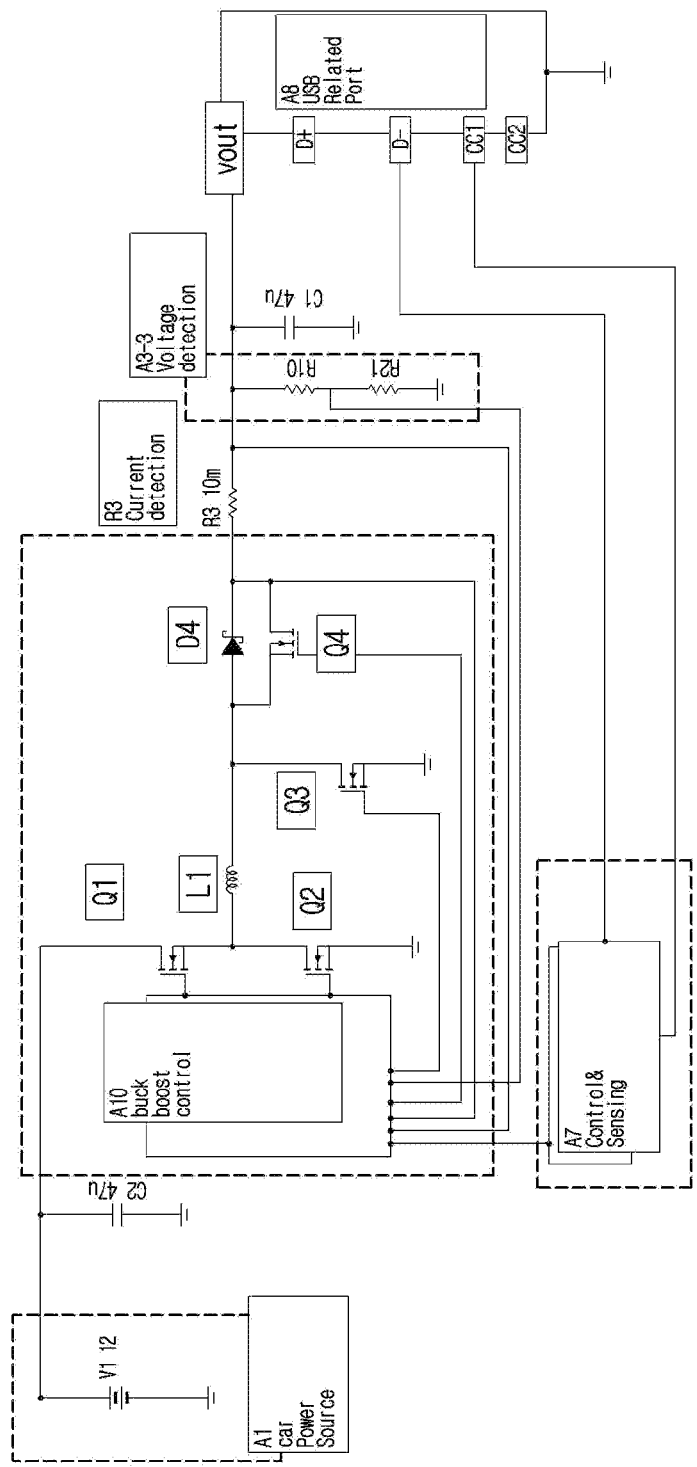
FIG. 1 schematically shows the circuit constitution of a general buck-boost converter.

On the other hand, the power supply unit of the present invention is inefficient a little in comparison to the general buck-boost converter as shown in FIG. 1, in view of the heat consumption in the entire system, because of adding the voltage boost circuit part in front of the voltage dropping part. However, the voltage boost circuit part in the present invention may freely select FETs to make the circuit construction being easy and may easily select the components having reduced drain to source resistance (RDS) and switching loss in accordance with the product constitution, therefore the heat management of the entire product becoming easy.

EXPLANATION OF REFERENCE NUMERALS

T1: Transformer
Q1, Q2, Q3, Q4: FET
ref: Reference Point (The Negative Pole of The Output Port)
L1, L2: Inductor
D4, D5: Diode

The invention claimed is:

1. A power supply unit using intellectual pre-regulator which comprises an input port connected to a power source realized as battery or generator, an output port connected to an electronic device, a voltage dropping part connected between said input port and said output port to drop an input voltage to match the input voltage to a voltage required by said electronic device, and a detection-control part to detect the voltage required by said electronic device connected to said output port and to transfer the required voltage to said voltage dropping part, wherein, a voltage boost circuit part is further arranged between the positive pole of said input port and a negative pole of said output port, said voltage boost circuit part is controlled by said detection-control part to produce a negative voltage at the negative pole of said output port from a voltage of the battery connected to said input port, and a switching element is further arranged between the negative pole of said input port and the negative pole of said output port, and wherein, said detection-control part makes said voltage boost circuit part being in the off state not to produce the negative voltage when the required voltage of the electronic device is lower than the battery voltage, at this time, said switching element is in the on state to flow a current from the negative pole of said output port to the negative pole of said input port, and the battery voltage is dropped by said voltage dropping part to a voltage same as the required voltage of the electronic device at said output port, meanwhile, said detection-control part makes said voltage boost circuit part switching to produce the negative voltage when the required voltage of the electronic device is higher than the battery voltage, at this time, said switching element is in the off state not to flow the current from the negative pole of said output port to the negative pole of said input port, and the voltage between the positive pole of said input port and the negative pole of said output port is dropped by said voltage dropping part to the voltage same as the required voltage of the electronic device at said output port.

2. The power supply unit using intellectual pre-regulator as set forth in claim 1, wherein said voltage boost circuit part comprises a FET switched by the control of said detection-control part, a transformer, a diode and a capacitor, in which said FET and a first side coil of said transformer are serially connected between the positive pole of said input port and the negative pole of said input port, a second side coil of said transformer, said capacitor and said diode are serially connected in order at a second side circuit of said transformer, the positive pole of the second side coil of said transformer is connected to the negative pole of said input port, and the negative pole of said capacitor is connected to the negative pole of said output port.

3. The power supply unit using intellectual pre-regulator as set forth in claim 1, wherein said switching element arranged between the negative pole of said input port and the negative pole of said output port is a diode or a FET.

4. The power supply unit using intellectual pre-regulator as set forth in claim 1, wherein said voltage dropping part is a sink buck or a non-sink buck, a precise control is performed by using all of the elements of a switching mode power supply, a coil, a feedback circuit, an error amp, a precise comparator, a temperature protection, a current limit circuit, the precise controls of said drooped voltage are treated in said voltage dropping part circuit, said voltage boost part circuit, to which a PWM duty is supplied in order to supply a supplement voltage for a short output voltage, is consist of a comparison circuit and a switching circuit to produce the voltage boost at the output port, a second voltage detection circuit is arranged between the positive pole of said output port and the negative pole of said output port, said detection-control part detects a voltage between the positive pole of said output port and the negative pole of said output port by said second voltage detection circuit, or said semiconductor switching control part detects the voltage between the positive pole of said output port and the negative pole of said output port by said second voltage detection circuit, said semiconductor switching control part controls switching for a first and second FETs based on voltage values to match the voltage of said output port to the required voltage of the electronic device connected to said output port.

\* \* \* \* \*